Patented July 19, 1949

2,476,347

UNITED STATES PATENT OFFICE 2,476,347

PRODUCTION OF SYNTHETIC RESIN MOLDING COMPOSITIONS

John Allan, Spondon, near Derby, England, assignor to Celanese Corporation of America, a corporation of Delaware No Drawing. Application October 9, 1946, Serial No. 702,103. In Great Britain October 23, 1945

7 Claims. (Cl. 260—17.2)

This invention relates to moulding compositions and moulded products and has as its principal object to produce materials of high impact strength.

The moulding compositions of the invention comprise unspun staple-fibres of regenerated cellulose of high tenacity and of average length at least 0.75 inch, impregnated with a synthetic resin. By "high tenacity" is meant a tenacity of at least 3 gms. per denier.

Preferably the fibres are impregnated with a solution of the synthetic resin in a volatile solvent which is subsequently removed. It is of advantage to carry out the impregnation under fluid pressure, and to this end the mass of fibres may be enclosed in a vessel which is then evacuated, and to which the impregnating solution is admitted at atmospheric pressure or preferably under super-atmospheric pressure. The impregnating solution may contain, in addition to the synthetic resin, any hardening agents, catalysts, mould lubricants, colouring agents or other substances adapted to facilitate moulding or to modify the properties of the mouldings obtained. In converting the wet mass of impregnated fibres to a dry moulding composition, it is best to remove most of the solvent by evaporation first at ordinary temperatures, then at higher temperatures, and to separate the fibres from one another while they still reain a proportion of residual solvent, for example 4-6%. This residual solvent makes it easier to separate the fibres without damage such as would result in lower impact strength in the mouldings. It is important with a view to obtaining a composition from which mouldings of high impact strength can be produced, to avoid subjecting the fibrous mass during or after impregnation to mechanical treatment such as would substantially shorten the fibres.

The invention may be illustrated as follows:

The fibrous material comprises staple fibres about 1 inch in length of a high tenacity obtained by stretching dry spun cellulose acetate yarn in wet steam or hot water to a tenacity of 6-8 grams per denier, completely saponifying the stretched yarn and cutting it into staple fibres. Yarn waste such as is obtained in the processing of such stretched, saponified yarn, can be cut up to form the fibrous material for the present invention. The staple fibre yarn is fed on to the perforated false-bottom of a pressure vessel having at the top a valve-controlled outlet connected with a vacuum line, and a relief valve set to open at about 60 lbs. per square inch, and at the bottom, below the false bottom, 2 valve-controlled inlets, one connected to a reservoir containing the resin solution and the other to a compressed air main. After introduction of the fibrous material the vessel is evacuated. The outlet valve is then closed and the inlet valve to the resin solution is opened, causing the resin solution to be forced under atmospheric pressure through the perforations in false bottom.

The composition of the resin solution used is as follows, the parts being by weight:

75 parts of a synthetic resin which is a condensation product of phenol and acetaldehyde in approximately equimolecular proportions, the condensation having been carried out in the presence of an acid catalyst.
15 parts of hexamethylene tetramine.
3 parts of aluminium stearate.
180 parts of industrial alcohol.

The synthetic resin is formed by slowly adding 250 parts of paraldehyde to 500 parts of phenol containing about 1% of concentrated hydrochloric acid as catalyst, the temperature being maintained at about 50° C. during the addition, raising the temperature to 98-100° C. when the reaction mix separates into an aqueous and resinous layer, and continuing the heating for about half an hour at about 120-130° C. The resin obtained is washed free from acid with warm water, separated and the remaining moisture removed by vacuum distillation at a temperature of about 100° C.

When the vessel is nearly full, the supply of resin solution is cut off and the compressed air inlet valve is opened. Air is supplied at a pressure slightly in excess of 60 lbs. per square inch so that it bubbles through the perforations in the false bottom and escapes through the relief valve, and in so doing stirs the contents of the vessel. After thorough impregnation with the resin solution, the fibrous mass is removed, centrifuged, and dried slowly to an alcohol content of about 5%. The drying can be effected at temperatures between 20 and 65° C. for instance by exposure for 24 to 48 hours to atmospheric temerature followed by a short exposure to a temperature of 90 to 95° C. Any adhesion between the fibres is then broken down, for example by treatment in a rotating arm disintegrator, care being taken to avoid any substantial shortening of the fibres in this treatment. The fibrous material is then further dried free from volatile solvent at about 55 to 65° C. The moulding composition so obtained has approximately the following composition, the parts being by weight:

43.4 parts of the synthetic resin
46.3 parts of fibre
8.6 parts of hexamethylene tetramine
1.7 parts of aluminium stearate From this composition a standard impact strength test bar is moulded at 160° C. and 2 tons per square inch pressure for 5 minutes. When subjected to the Izod notched bar impact strength test, it is found to have an impact strength in excess of 10 ft.-pounds per inch of notch. Moulding compositions made in a similar way but under such conditions that the fibrous material is exposed to mechanical treatment which substantially shortens the fibres, as for example when impregnation is carried out in an internal mixer or in a Hollander mixer or on mixing rolls, were found to give mouldings of very much lower impact strength.

The relative proportions of fibre and synthetic resin may be varied, for instance by varying the concentration of the resin solution. Preferably the concentration of hexamethylene tetramine and of mould lubricant should be varied in about the same proportions as the concentration of resin. Typical impact strength figures obtained with compositions according to the invention containing various proportions of fibre are shown in the following table, the percentages being by weight and the impact strength being expressed in ft. lbs./inch of notch when measured by the Izod method.

Table

| Resin, Per Cent | Fibre, Per Cent | Hexamethylene Tetramine, Per Cent | Aluminium Stearate, Per Cent | Average Impact Strength |
| --- | --- | --- | --- | --- |
| 43.2 | 46.2 | 8.6 | 1.7 | 10.2 |
| 38.0 | 53.0 | 7.6 | 1.4 | 21.2 |
| 36.3 | 55.0 | 7.3 | 1.4 | 20.2 |
| 34.3 | 57.5 | 6.8 | 1.4 | 13.6 |
| 30.6 | 61.9 | 6.2 | 1.3 | 12.6 |

In making the synthetic resin for the moulding compositions of the invention, the molecular ratio of acetaldehyde to phenol is preferably as described above, about 1:1, but it may be slightly less or slightly greater, e. g. from about 1.25:1 down to about 1:1.25 or 1:1.5, the proportion of hexamethylene tetramine employed being increased when the molecular ratio of acetaldehyde to phenol is below 1:1. The total molecular ratio of acetaldehyde employed plus formaldehyde available in the hexamethylene tetramine, to phenol employed should not be less than 1:1. Although it is preferred to employ acetaldehyde in forming the thermosetting synthetic resin, very useful results can be obtained using formaldehyde instead, in the same molecular proportions relative to the phenol as have been indicated above for acetaldehyde. By condensing formaldehyde with phenol in the molecular ratio of about 3:2 in the presence of an alkaline catalyst, a synthetic resin is obtained which is capable of hardening when heated even in the absence of a source of additional formaldehyde such as hexamethylene tetramine, so that from moulding compositions containing such resin the hexamethylene tetramine can be omitted. A longer period of heating, however, is necessary to harden such resins, and for the purpose of the present invention it is preferred to use synthetic resins made with lower molecular proportions of aldehyde, using an acid catalyst, and to incorporate a source of formaldehyde such as hexamethylene tetramine in the moulding composition.

The regenerated cellulose material of high tenacity may be used in conjunction with other fillers for the plastic, for example wood flour or other cellulosic filler or a mineral filler, for example asbestos in the form of floats or fibres. White or coloured pigments may also be employed in the composition.

Instead of using the high tenacity regenerated cellulose fibres obtained by the saponification of high tenacity fibres of cellulose acetate, high tenacity regenerated cellulose fibres produced in other ways may be employed. Thus, for example, high tenacity regenerated cellulose fibres may be obtained by spinning unstable cellulose derivatives such as viscose into baths in which the cellulose is regenerated, the materials being stretched considerably during their formation to produce the desired high tenacity; or high tenacity materials of regenerated cellulose may be obtained by the cuprammonium process, the materials again being stretched considerably during their formation. The best results, however, have been obtained by the use of materials produced by the saponification of high tenacity materials of dry spun cellulose acetate which have been stretched to a considerable degree, for example to 5 to 10 or 20 times their original length or even more, under the influence of steam or hot water. This method of producing the high tenacity fibre enables fibres of very low extensibility to be obtained. Thus, the extension at break may be from about 5 or 6% or even less to about 8 or 9% of the original length. Other methods of making high tenacity regenerated cellulose fibres involving stretching gives fibres of low extensibility although figures of such a low order as those referred to above are not easily obtained by those methods. The extensibility of the fibres appears to have an important bearing on the impact strength obtainable.

Especially valuable results have been obtained when the regenerated cellulose of which the fibres are composed is of high molecular weight as shown by the viscosity of solutions of the regenerated cellulose. High tenacity fibres of regenerated cellulose of high molecular weight can be made by saponification, under conditions in which degradation is minimised, of high tenacity fibres of a "high viscosity" cellulose acetate, e. g. a cellulose acetate such that a 6% solution in 95% aqueous acetone at 25° C. has a viscosity compared with glycerine at the same temperature of at least 40%. The viscosity of the cellulose acetate employed may with advantage be between 40 and 100 or even 200% or more when measured as described above. The tenacity of the regenerated cellulose fibres must be at least three grams per denier and is preferably considerably higher, for example from 3 to 6 or 8 grams per denier or more. The extension at break is preferably of the low order referred to above. For fibres of the kind which it is preferred to employ, the stress/strain curve is substantially straight up to the point of break.

Besides their low extensibility, fibres obtained by saponifying high tenacity fibres of cellulose acetate, especially high viscosity cellulose acetate, have shown excellent resistance to degradation at the temperatures at which moulding is effected, compared with other textile fibres. In addition, these fibres are of remarkably high water-resistance compared with other textile fibres. Thus, the ratio of wet-tenacity to dry-tenacity for such fibres is commonly as high as 75% and may be much higher, e. g. 80–90%. These figures are much higher than the corresponding figures for other kinds of regenerated cellulose fibres and for the best natural cellulosic fibres. Mouldings incorporating these more highly-resistant fibres give excellent performance in wet conditions as well as in dry, even when the ratio of fibre to resin is high and when the conditions of use are such that wear or other slight superficial damage may expose the filling fibres to attack by moisture.

The invention has been described with particular reference to the use as the synthetic resin of a condensation product of phenol and formaldehyde or acetaldehyde. Other synthetic resins may be used in a similar way, for example similarly constituted condensation products of phenol with benzaldehyde or furfural; or of any of these aldehydes with other phenols, especially mono-nuclear phenols which are unsubstituted in the ortho and para positions to the hydroxy group or to one of the hydroxy groups, for example meta-cresol or resorcinol or with bi- or multi-functional amino compounds, for example urea, thiourea, guanidine, dicyandiamide, piperazine or melamine.

The invention, though of particularly utility in the production of mouldings from thermosetting synthetic resins which are condensation polymers, may also be employed in the production of mouldings from other synthetic resins, especially heat-hardening addition polymers of substances containing a plurality of olefinic linkages, e. g. di-allyl phthalate, di-allyl ketone and allyl methacrylate.

Mouldings produced according to the present invention have many uses where a plastic which is resistant to shock is required, for example in the production of machine housings, instrument casings including radio cabinets and clock cases, gear wheels, industrial truck wheels, pulleys, slats for escalators and conveyors, shuttles, shuttleboxes and other loom components, bobbins and other textile package carriers, golf club heads, rifle butts, and protective helmets.

Having described my invention, what I desire to secure by Letters Patent is:

1. Process for the production of a molding composition which comprises impregnating randomly arranged regenerated cellulose staple fibers of tenacity at least 3 grams/denier and of average length at least 0.75 inch with a solution of a synthetic resin in a volatile solvent therefor, evaporating the bulk of the solvent, and breaking down adhesion between the impregnated fibers without substantially shortening the fibers, by mechanical treatment applied while the fibers still contain a small amount of solvent.

2. Process for the production of a molding composition which comprises impregnating randomly arranged regenerated cellulose staple fibers of tenacity at least 6 grams/denier and of average length at least 1 inch with an alcoholic solution of an acid-catalyzed condensation product of a phenol and an aldehyde, evaporating the bulk of alcohol and breaking down adhesion between the impregnated fibers without shortening the fibers, by mechanical treatment applied while the fibers still contain about 5% of alcohol.

3. Process for the production of a molding composition which comprises impregnating randomly arranged regenerated cellulose staple fibers of tenacity at least 6 grams/denier and of average length at least 1 inch with an alcoholic solution of an acid-catalyzed condensation product of a phenol and formaldehyde in substantially equimolecular proportions, said solution containing at least half a molecular proportion, based on the phenol, of hexamethylene tetramine, together with a suitable mold lubricant, evaporating the bulk of the alcohol and breaking down adhesion between the impregnated fibers without shortening the fibers, by mechanical treatment applied while the fibers still contain about 5% of alcohol.

4. Process for the production of a molding composition which comprises impregnating randomly arranged regenerated cellulose staple fibers of tenacity at least 6 grams/denier and of average length at least 1 inch with an alcoholic solution of an acid-catalyzed condensation product of a phenol and acetaldehyde in substantially equimolecular proportions, said solution containing at least half a molecular proportion, based on the phenol, of hexamethylene tetramine, together with a suitable mold lubricant, evaporating the bulk of the alcohol and breaking down adhesion between the impregnated fibers without shortening the fibers, by mechanical treatment applied while the fibers still contain about 5% of alcohol.

5. Process for the production of a molding composition which comprises impregnating in an evacuated zone randomly arranged regenerated cellulose staple fibers of tenacity at least 6 grams/denier and of average length at least 1 inch with an alcoholic solution of an acid-catalyzed condensation product of a phenol and an aldehyde, the solution being supplied under pressure, evaporating the bulk of the alcohol and breaking down adhesion between the impregnated fibers without shortening the fibers, by mechanical treatment applied while the fibers still contain about 5% of alcohol.

6. Process for the production of a molding composition which comprises impregnating, in an evacuated zone, randomly arranged regenerated cellulose staple fibers of tenacity at least 6 grams/denier and of average length at least 1 inch with an alcoholic solution of an acid-catalyzed condensation product of a phenol and formaldehyde in substantially equimolecular proportions, said solution being supplied under pressure and containing at least half a molecular proportion, based on the phenol, of hexamethylene tetramine, together with a suitable mold lubricant, evaporating the bulk of the alcohol and breaking down adhesion between the impregnated fibers without shortening the fibers, by mechanical treatment applied while the fibers still contain about 5% of alcohol.

7. Process for the production of a molding composition which comprises impregnating, in an evacuated zone, randomly arranged regenerated cellulose staple fibers of tenacity at least 6 grams/denier and of average length at least 1 inch with an alcoholic solution of an acid-catalyzed condensation product of a phenol and acetaldehyde in substantially equimolecular proportions, said solution being supplied under pressure and containing at least half a molecular proportion, based on the phenol, of hexamethylene tetramine, together with a suitable mold lubricant, evaporating the bulk of the alcohol and breaking down adhesion between the impregnated fibers without shortening the fibers, by mechanical treatment applied while the fibers still contain about 5% of alcohol.

JOHN ALLAN.

(References on following page)

REFERENCES CITED

The following references are of record in the file of this patent:

UNITED STATES PATENTS

| Number | Name | Date |
|---|---|---|
| 1,223,216 | Talley | Apr. 17, 1917 |
| 2,168,335 | Heckert | Aug. 8, 1939 |
| 2,240,480 | Dillehay | May 6, 1941 |
| 2,398,001 | Haney | Apr. 9, 1946 |

FOREIGN PATENTS

| Number | Country | Date |
|---|---|---|
| 116,283 | Australia | Mar. 2, 1944 |
| 316,275 | Great Britain | Dec. 2, 1929 |
| 477,222 | Great Britain | Dec. 24, 1937 |
| 545,216 | Great Britain | May 15, 1942 |